(12) United States Patent
Houser

(10) Patent No.: US 6,720,403 B1
(45) Date of Patent: Apr. 13, 2004

(54) POLYURETHANEUREA AND SPANDEX COMPRISING SAME

(75) Inventor: Nathan E. Houser, Afton, VA (US)

(73) Assignee: E.I. duPont de Nemours and Co., Wilmington, DE (US)

( * ) Notice: Subject to any disclaimer, the term of this patent is extended or adjusted under 35 U.S.C. 154(b) by 0 days.

(21) Appl. No.: 10/286,723

(22) Filed: Nov. 1, 2002

(51) Int. Cl.$^7$ .............................................. C08G 18/65
(52) U.S. Cl. ........................................ 528/85; 528/906
(58) Field of Search .................................. 528/85, 906

(56) References Cited

U.S. PATENT DOCUMENTS

| | | |
|---|---|---|
| 3,507,834 A | 4/1970 | Wittbecker |
| 3,542,839 A | 11/1970 | Martin |
| 3,549,696 A | 12/1970 | McMillin et al. |
| 3,631,138 A | 12/1971 | Peters |
| 4,973,647 A | 11/1990 | Bretches et al. |
| 5,000,899 A | 3/1991 | Dreibelbis et al. |
| 5,032,664 A | 7/1991 | Frauendorf et al. |
| 5,539,037 A | 7/1996 | Iqbal |
| 5,734,076 A | 3/1998 | Daum et al. |
| 5,879,799 A | 3/1999 | Yosizato et al. |
| 5,948,875 A | 9/1999 | Liu et al. |
| 5,981,686 A | 11/1999 | Waldbauer, Jr. |
| 6,063,892 A | 5/2000 | Houser et al. |
| 6,372,834 B1 | 4/2002 | Uemura |
| 6,376,071 B1 | 4/2002 | Tanaka et al. |

FOREIGN PATENT DOCUMENTS

| | | |
|---|---|---|
| DE | 19545757 A1 | 6/1996 |
| GB | 1102819 | 2/1968 |
| WO | WO 96/05171 | 2/1996 |
| WO | WO 99/67227 | 12/1999 |
| WO | WO 01/25308 | 4/2001 |

*Primary Examiner*—Rachel Gorr
(74) *Attorney, Agent, or Firm*—Robert B. Furr, Jr.

(57) ABSTRACT

Spandex having good whiteness retention, high heat-set efficiency, and percent set is made from comprises amide soluble polyurethaneurea polymers prepared by reacting polyether which comprises the reaction product of a polymeric glycols with ortho-substituted diisocyanates and bulky diamine chain extenders.

10 Claims, No Drawings

POLYURETHANEUREA AND SPANDEX COMPRISING SAME

FIELD OF THE INVENTION

The present invention relates to polyurethaneureas which are soluble in amide solvents and which are prepared from a polymeric glycol, at least one alkyl substituted 1,1'-methylenebis(4-isocyanatobenzene), and at least one doubly-hindered diamine. The present invention also relates to segmented polyurethaneurea fibers, dry-spun or wet-spun, comprising such polyurethaneureas and having superior whiteness retention, heat-set efficiency, and low percent set.

BACKGROUND

For the sake of convenience, and not of limitation, the present invention herein is discussed in terms of spandex, but should be construed to include all embodiments described in the following disclosure and equivalents.

Spandex has found widespread use in the apparel industry, such as in hosiery, foundation garments and sportswear where an elastic polymer imparts beneficial properties. Spandex is susceptible to discoloration under certain environmental conditions, for example in the presence of elevated temperatures and atmospheric gases such as nitrogen dioxide. The thermal stability of spandex is of particular interest because spandex-containing fabrics and garments are typically heat-set to provide dimensional stability and to shape the finished garment. In the manufacture of tricot knits and women's hosiery, for example, spandex is often knit into the fabric with nylon. After knitting, the fabric is frequently heat-set to remove wrinkles and stabilize the dimensions of the fabric. Typical heat-setting temperatures used in commercial operations are 195° C. for fabrics containing spandex and 6,6-nylon, 190° C. when the fabric contains 6-nylon, and 180° C. when the fabric contains cotton. It is also desirable to heat-set fabrics containing cotton and spandex, but if the spandex has adequate heat-set efficiency only at temperatures used for nylon- containing fabrics, the spandex cannot be properly heat-set in cotton-containing fabrics, which will be damaged by exposure to the required high temperatures. Improved heat-setting efficiency is desirable to save energy and improve productivity, and reduced discoloration by heat is desirable to provide an improved appearance. It is desirable, therefore, to prepare a spandex having a combination of good environmental resistance ("whiteness retention") and high heat-set efficiency thus saving energy and improving productivity, especially if the mechanical properties of the spandex are not adversely affected.

DESCRIPTION OF THE ART

A variety of methods have been used to improve the heat-set efficiency of spandex and thereby lower the temperature at which the spandex can be heat-set. For example, the use of 15–32 mole percent of 2-methyl-1,5-pentanediamine as a coextender in making spandex is disclosed in U.S. Pat. No. 4,973,647,but such low levels do not provide spandex with sufficiently high heat-set efficiency at the moderate temperatures permitted for fabrics containing cotton. U.S. Pat. Nos. 5,000,899, 5,948,875 and 5,981,686 disclose the use of high proportions of 2-methyl-1, 5pentanediamine and 1,3-diaminopentane chain extender, respectively, to increase the heat-set efficiency of spandex, but using such large amounts of co-extender can add to the cost of the fiber. U.S. Pat. No. 5,539,037 discloses the use of low concentrations of alkali metal carboxylates and thiocyanate in spandex to increase its heat-set efficiency. However, such salts can be removed by dissolution during fabric processing, and their effectiveness can thereby be reduced. Japanese Published Patent Applications JP07-82608, JP08-020625, JP08-176253,and JP08-176268 and U.S. Pat. Nos. 3,631,138 and 5,879,799 disclose the use of various levels of isocyanato-2-[(4'-isocyanatophenyl)methyl]benzene. The properties of spandex made from such compositions, however, do not have the desired combination of high heat-set efficiency, elongation, and unload power.

The use of substituted diisocyanates in the preparation of segmented polyurethanes for spandex has been reported. British Patent Number 1,102,819 discloses the preparation of spandex using methyl-and ethyl-substituted 4,4'-methylenebis(2,6-dimethylphyenyl)diisocyanates in combination with polytetramethyleneether glycol. The resulting "capped" glycols were then reacted with conventional chain extenders such as ethylenediamine, 2-methyl-1,5-pentamethylenediamine, propylenediamine, and the like. The polyurethaneureas prepared by this reaction, however, are insufficiently soluble to be commercially useful in making spandex by dry-spinning or wet-spinning from solution. International Published Patent Application, WO 96/05171 discloses the use of 4,4'-methylene-bis-(3-chloro-2,6-dialkylphenylisocyanates) in coatings as a less toxic replacement for toluene-2,4-diisocyanate. However, polyurethane polymers prepared from this diisocyanate and the polymeric glycols and diamine chain extenders suitable for making spandex, do not have the necessary solubility for spinning spandex from amide solvents.

There is a need for polyurethaneureas which are sufficiently soluble to be used for dry-spinning and/or wet-spinning spandex with improved whiteness retention, heat-set efficiency, and low percent set.

SUMMARY OF THE INVENTION

The present invention relates to a polyurethaneurea comprising the reaction product of a polymeric glycol, at least one Orthoalkyl-MDI, and a diamine chain extender composition comprising at least one bulky diamine. The Orthoalkyl-MDI according to the present invention are shown in Formula I:

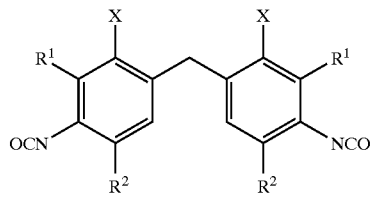

wherein:
  each $R^1$ may be the same or different and are independently selected from hydrogen, methyl, ethyl, propyl or isopropyl;
  each $R^2$ may be the same or different and are independently selected from hydrogen, methyl, ethyl, propyl or isopropyl; and
  each X may be the same or different and are selected from hydrogen, fluorine, or chlorine, preferably hydrogen or chlorine.

Unless otherwise indicated, as used herein the term, "Amide soluble" means that the polyurethaneurea is capable of being dissolved in at least one amide solvent to form a spinnable solution.

1,3-BAMCH refers to 1,3-bis(aminomethyl)cyclohexane;

"Bulky diamine" refers to a chain extender diamine sterically hindered at both amine groups;

1,4-DAB refers to 1,4-diaminobutane;

1,2-DACH refers to 1,2-diaminocyclohexane;

1,3-DACH refers to 1,3-diaminocyclohexane;

DCTEMDI refers to bis(2-chloro-3,5-diethyl-4-isocyanatophenyl)methane;

DEA refers to diethylamine;

DIDMMDI refers to bis(3-isopropyl-4-isocyanato-5-methylphenyl)methane;

DIMDI refers to bis(3-isopropyl-4-isocyanatophenyl)methane;

DMAc refers to N,N-dimethylacetamide;

DMDEMDI refers to bis(3-methyl-4-isocyanato-5-ethylphenyl)methane;

EDA refers to ethylenediamine;

MDI refers to 4,4'-diphenylmethane diisocyanate;

MPMD refers to 2-methyl-1,5-pentanediamine;

NPDA refers to neopentylenediamine (2.2'-dimethyl-1,3-diaminopentane);

"Orthoalkyl-MDI" refers to a diisocyanate having two or more alkyl groups of one to three carbon atoms on the positions ortho to the isocyanate groups (the 3,5-positions), optionally substituted with one or more halogens;

1,2-PDA refers to 1,2-diaminopropane;

1,3-PDA refers to 1,3-diaminopropane;

PO4G refers to poly(tetramethyleneether) glycol;

PO(4G/2Me4G) refers to poly(tetramethyleneether-co-2-methyltetramethyleneether) glycol;

"Spandex" refers to manufactured fiber in which the fiber-forming substance is a synthetic polyrner comprised of at least 85% of a segmented polyurethane (16 C.F.R. § 303.7(k), Federal Trade Commission)

TEMDI refers to bis(3,5-diethyl-4-isocyanatophenyl)methane;

TIMDI refers to bis(3,5-diisopropyl-4-isocyanatophenyl)methane; and

TMMDI refers to bis(3,5-dimethyl-4-isocyanatophenyl)methane.

DETAILED DESCRIPTION OF THE INVENTION

It has now been unexpectedly found that the whiteness retention, heat-set efficiency and percent set are improved when spandex comprises the reaction product of a polymeric glycol, at least one diisocyanate having two or more alkyl groups of one to three carbon atoms on the positions ortho to the isocyanate groups (the 3,5-positions) and a composition comprising at least one bulky diamine. As heat-set temperature rises, so too does heat-set efficiency, and the improvement observed in the spandex of the invention is useful and advantageous both: (i) at the low heat-set temperatures typical for fabrics containing spandex and cotton or wool; and (ii) at the higher temperatures used for fabrics containing spandex and hard fibers, such as nylon. The polyurethaneureas of the present invention have unexpectedly good solubility in amide solvents, and spandex spun from these polymers has unexpectedly good resistance to environmental conditions.

Polymers useful in this invention are customarily prepared by reacting a di-functional polymer, such as a polymeric glycol, with a diisocyanate to form a mixture of isocyanate-terminated prepolymer and unreacted diisocyanate ("capped glycol"). The capped glycol can be dissolved in a suitable solvent such as dimethylacetamide, dimethylformamide, or N-methylpyrrolidone, and then reacted with a difunctional chain extender composition to form a polyurethaneurea solution. If desired, dibutyltin dilaurate, stannous octoate, mineral acids, tertiary amines such as triethylamine, N,N'-dimethylpiperazine, and the like, or other known catalysts can be used to increase the rate of capping and chain extension. Such polyurethaneureas are termed "segmented" because they are comprised of "hard" urethane and urea segments derived from the diisocyanate and chain extender and "soft" segments derived primarily from the polymeric glycol. The solubility of the polyurethaneurea is important because insolubles such as "gels" can hinder commercial spandex production which is typically accomplished using dry-spinning or wet-spinning techniques.

Polymeric glycols used in the preparation of the polyurethanes can include polyether glycols, polyester glycols and polycarbonate glycols. Useful polymeric glycols can include, but are not limited to, poly(trimethyleneether) glycol, poly(tetramethyleneether) glycol, poly(tetramethylene-co-2-methyl-tetramethyleneether) glycol, poly(ethylene-co-tetramethyleneether) glycol, poly(propylene-co-tetramethyleneether) glycol, poly(ethyleneco-butylene adipate) glycol, poly(2,2-dimethyl-1,3-propylene dodecanedioate) glycol, poly(3-methyl-1,5-pentamethylene dodecanedioate) glycol, poly(pentane-1,5-carbonate) glycol, and poly(hexane-1,6-carbonate) glycol. When poly(tetramethylene-co-2-methyl-tetramethyleneether) glycol is used, the 2-methyltetramethyleneether moiety can be present in the range of about 4 to about 20 mole percent. Preferably, the polymeric glycol is a polyether glycol, more preferably poly(tetramethyleneether) glycol or poly(tetramethyleneether-co-2-methyltetramethyleneether) glycol.

In the preparation of the polyurethaneurea of the present invention, at least one Orthoalkyl-MDI must be used. Such Orthoalkyl-MDI includes, but is not limited to, TMMDI, DIDMMDI, TEMDI, TIMDI, DIMDI, DCTEMDI, DMDEMDI, and the like. Preferred Orthoalkyl-MDI is TMMDI and TEMDI, more preferably, TEMDI.

The polyurethaneurea can comprise the reaction product of a polymeric glycol, one or more Orthoalkyl-MDI in combination with MDI, and a bulky diamine. The total amount of Orthoalkyl-MDI is at least about 20 mole percent of total diisocyanates, preferably at least about 60 mole percent of the total diisocyanates. In one embodiment, the composition of diisocyanates comprises only Orthoalkyl-MDI. In making the capped glycol, the diisocyanate(s) can be added all at once or in two or more steps and in any order.

For the polyurethaneurea to have sufficient solubility in amide solvents to spin spandex from the polymer solution, the diamine chain extender composition must comprise at least one bulky diamine. Examples of bulky diamines include NPDA, 2,5-dimethyl-2,5-hexanediamine, 2,5-dimethylpiperazine, 2,3,5,6-tetramethyl-1,4-diaminocyclohexane, and the like. NPDA is preferred.

The bulky diamine is present to an extent of at least about 80 mole percent, and preferably at least about 90 mole percent, of the total diamine chain extender composition, any remaining diamine being selected from conventional diamine chain extenders such as ethylenediamine, 1,3- diaminocyclohexane, 1,1'-methylenebis(4-aminocyclohexane), 2-methyl-1,5-diaminopentane, 1,3-diaminopentane, and 1,2-diaminopropane, and the like, and mixtures thereof. Optionally, a chain terminator, for example diethylamine, cyclohexylamine, or n-hexylamine can be used to control the molecular weight of the polymer, and small amounts of tri-functional compounds such as diethylenetriamine can be used to help control solution viscosity.

In a preferred embodiment, the polyurethaneurea comprises the reaction product of PO4G or PO(4G/2Me4G), at least about 60 mole percent TMMDI, TEMDI, or mixtures thereof, and optionally MDI, and a mixture of chain extenders comprising at least about 90 mole percent neopentylene diamine.

In an alternate embodiment, the polyurethaneurea can be the reaction product of PO4G, a mixture of diisocyanates comprising MDI and an Orthoalkyl-MDI selected from TIMDI and TEMDI, the mole ratio of Orthoalkyl-MDI to MDI being at least 20/80, and a diamine chain extender composition comprising NPDA.

The spandex can contain additives such as stabilizers and pigments, provided such additives do not detract from the benefits of the invention. Among such additives are benzotriazole-based stabilizers, ultraviolet light absorbers, other light resistance agents, antioxidants, delustrants, antitack agents, dyes and dye enhancers, lubricants such as mineral oil and silicone oils, deodorants, and antistatic agents. Other examples of additives include Methacrol® 2462 (a registered trademark of E.I. du Pont de Nemours and Company, a polymer of bis(4-isocyanatocyclohexyl) methane and 3-t-butyl-3-aza-1,5-pentanediol), titanium oxide, zinc oxide, magnesium stearate, barium sulfate, hydrotalcite, mixtures of huntite and hydromagnesite, bactericides containing silver, zinc, or compounds thereof, and the like.

Strength and elastic properties of the spandex were measured in accordance with the general method of ASTM D 2731-72. For the examples reported in Tables 2 and 3 below, spandex filaments having a 5 cm gauge length were cycled between 0% and 300% elongation at a constant elongation rate of 50 cm per minute. Load Power ("LP") was determined at 200% elongation on the first cycle and is reported in the Tables in deciNewtons per tex. Unload Power ("UP") was determined at 200% elongation on the fifth cycle and is reported in the Tables in deciNewtons per tex. Percent elongation at break ("Eb") was measured on the sixth extension cycle.

Percent set was determined as the elongation remaining between the fifth and sixth cycles as indicated by the point at which the fifth unload curve returned to substantially zero stress. Percent set was measured 30 seconds after the samples had been subjected to five 0–300% elongation/relaxation cycles. The percent set was then calculated as % Set=100(Lf−Lo)/Lo, where Lo and Lf are the filament (yarn) length, when held straight without tension, before (Lo) and after (Lf) the five elongation/relaxation cycles.

All whiteness retention tests were performed on fiber which had been scoured and mock dyed as follows. Cards wound with spandex were immersed in a bath containing 1.5 grams of DUPONOL EP (sold by Witco, Memphis, Tenn.) per liter of water. The bath was then heated to boiling where it remained for 1 hour. The cards were then rinsed with water and put into a bath containing water adjusted to pH=5 with dilute phosphoric acid (further adjusted with dilute sodium hydroxide if necessary), and the bath was heated to boiling. The cards remained in this bath for 1 hour (mock dye) and were then rinsed with distilled water. After air-drying, the b-values of the cards were measured and recorded as the original, scoured "b-value". The cards were then exposed to fume, UV, $NO_2$, and thermal tests substantially as described in U.S. Pat. No. 5,219,909, which is incorporated herein by reference. The changes in "b-value" are reported in the Tables below, as "delta b".

To measure heat-set efficiency ("HSE"), the yarn samples were mounted on a 10 cm frame and stretched 1.5×. The frame (with sample) was placed in an oven preheated to 175° C. or 190° C. for 90 seconds. The samples were allowed to relax and the frame to cool to room temperature. The samples (still on the frame) were immersed in boiling water for 30 minutes. The frame and samples were removed from the bath and allowed to dry. The length of the yarn samples was measured, and heat set efficiency was calculated according to the following formula:

$$\% \ HSE = \left[ \frac{\text{Heat-set length} - \text{Original length}}{\text{Elongated length} - \text{Original length}} \right] \times 100$$

The following examples are provided to illustrate the present invention and should not be construed as limiting the scope of the invention.

EXAMPLE 1

Bis(3,5-dimethyl-4-isocyanatophenyl)methane ("TMMDI") was prepared according to the following procedure. In a two-liter reaction vessel, 127.2 g (0.50 mol) 4,4'methylenebis(2,6-dimethylaniline) (Aldrich Chemical Co., Milwaukee, Wis.), was dissolved in 1100 mL of 1,2-dichlorobenzene ("DCB") and phosgenated using the method commonly known in the art as cold-hot phosgenation: Phosgene (148.4 g, 1.50 mol) was added to 600 mL of cold DCB, under a Dry Ice-cooled condenser. With rapid stirring of the phosgene solution and cooling with an ice-water bath, a solution of the diamine in 500 mL of DCB was added over about 20 minutes. The cooling bath was replaced with a heating mantle and the reaction mixture heated over 90 minutes, with stirring, to a final temperature of 130° C. After 90 minutes, the solution was clear. The mixture was cooled to room temperature while excess phosgene was removed via a nitrogen sparge.

The DCB was removed by distillation at reduced pressure and the residue flash vacuum distilled, at 8.0 Pa, to afford 147 g of TMMDI (0.48 mol, 96% yield) at b.p. 180–190° C. (m.p. 130–131° C.).

EXAMPLE 2

Bis(3-methyl-4-isocyanato-5-ethylphenyl)methane ("DMDEMDI") was prepared according to the following procedure. A one4liter three-necked flask was purged with nitrogen and charged with 85 mL of water, 346 mL of concentrated HCl (4.01 mol), and 270.4 g (2.00 mol) of 6-ethyl-ortho-toluidine (Aldrich Chemical Co., Milwaukee, Wis.). The mixture was mechanically stirred at 50–55° C. while 82.4 mL of 37% aqueous formaldehyde (1.10 mol) was added dropwise. The reaction was maintained at 50–55° C., with stirring, overnight. The contents were cooled to room temperature, and 683 mL of 6.0M sodium hydroxide (4.10 mol) was added with continued stirring and cooling. The solid product was collected by suction filtration, washed thoroughly with water, and dried at 65° C. in a vacuum oven under a nitrogen purge leaving 276.2 g of 4,4'-methylenebis (2-ethyl-6methylaniline) (0.97 mol, 97% yield, m.p. 85–86° C.).

In a two-liter reaction vessel, 141.2 g (0.50 mol) 4,4'-methylenebis(2-ethyl-6-methylaniline) was cold-hot phosgenated as follows: Phosgene (148.4 g, 1.50 mol) was added to 600 mL of cold DCB, under a Dry Ice-cooled condenser. With rapid stirring of the phosgene solution and cooling with an ice-water bath, a solution of the diamine in 400 mL of DCB was added over about 30 minutes. The cooling bath was replaced with a heating mantle, and the reaction mixture heated over 80 minutes, with continued stirring, to a final temperature of 97° C. After 80 minutes the solution was clear. The contents were cooled to room temperature, while excess phosgene was removed via a nitrogen sparge.

The DCB was removed by distillation at reduced pressure and the residue flash vacuum distilled at 5–10 Pa to afford 140.9 g DMDEMDI (0.42 mol, 84% yield), as a fraction boiling at approximately 200° C.

EXAMPLE 3

Bis(3,5-diethyl-4-isocyanatophenyl)methane ("TEMDI") was prepared according to the following procedure. In a one-liter reaction vessel, a 74.5 9 (0.24mol) of methylenebis(2,6-diethylaniline) (Aldrich Chemical Co., Milwaukee, Wis.) was cold-hot phosgenated as follows: Phosgene (71.2 g, 0.72 mol) was added to 300 mL of cold DCB, under a Dry Ice-cooled condenser. With rapid stirring of the phosgene solution and cooling with an ice-water bath, a solution of the diamine in 250 mL of DCB was added over about 15 minutes. The cooling bath was replaced with a heating mantle, and the reaction mixture was heated over 110 minutes, with continued stirring, to a final temperature of 125° C. After 110 minutes the solution was clear. The contents were cooled to room temperature while excess phosgene was removed via a nitrogen sparge.

The DCB was removed by distillation at reduced pressure, and the residue flash vacuum distilled at 12 Pa to afford 79.2 g TEMDI (0.22 mol, 91% yield) as a fraction boiling at 190–200° C. (m.p. 56–57° C.).

EXAMPLE 4

Bis(3-isopropyl-4-isocyanato-5-methylphenyl)methane ("DIDMMDI") was prepared according to the following procedure. In a one-liter reaction vessel, 100.0 g (0.322 mol) of 4,4'-methylenebis(2-methyl-6-isopropylaniline) (Spectrum Chemical Manufacturing Corp., New Brunswick, N.J.) was cold-hot phosgenated as follows: Phosgene (95.6 g, 0.966 mol) was added to 400 mL of cold DCB, under a Dry Ice-cooled condenser. With rapid stirring of the phosgene solution and cooling with an ice-water bath, a solution of the diamine in 350 mL of DCB was added over about 20 minutes. The cooling bath was replaced with a heating mantle, and the reaction mixture heated over 70 minutes, with continued stirring, to a final temperature of 82° C. After 70 minutes the solution was clear. The contents were cooled to room temperature while excess phosgene was removed via a nitrogen sparge.

The products of four such phosgenations were combined, and DCB removed by distillation at reduced pressure. The residue was flash vacuum distilled at 7 Pa to afford DIDMMDI in greater than 90% yield, as a fraction boiling at 200–210° C. The product was further purified by crystallization from hexane, providing white crystals m.p. 86–87° C. TIMDI, DIMDI, AND DCTEMDI were prepared similarly.

EXAMPLE 5

The solubility of polyurethaneureas was determined visually at the time of polymerization, substantially according to the following example for polyurethaneurea based on TMMDI. [E85680-6] A one-liter glass resin kettle was provided with a nitrogen sweep, a metal "basket" stirrer, and a mechanical air-driven motor. The kettle was flame dried and allowed to cool under nitrogen. 157.746 Grams of 1800 molecular weight PO4G (TERATHANE 1800, a registered trademark of E.I. du Pont de Nemours and Company) and 20 mL of toluene were added and heated at 115° C. to 120° C. in an oil bath with stirring for 90 minutes to dry the glycol via a toluene/water azeotrope. The glycol was cooled to about 50° C., and 44.562 grams of TMMDI (mw 306.4) was added as a white powder. The mixture was stirred for 30 minutes at room temperature, heated to 90° C. to 105° C., and stirred at that temperature until the capping reaction was complete, after which the resulting capped glycol was allowed to cool to room temperature overnight under dry nitrogen. The capping ratio was 1.66,and the %NCO was 2.42. Dimethylacetamide (483.6 g, "DMAc") was added and the mixture stirred for one hour to dissolve the capped glycol. A mixture of 5.716 g 2,2-dimethyl-1,3-diaminopentane (neopentylenediamine, "NPDA") and 0.606 g diethylamine, dissolved in a few milliliters of DMAc, was added by syringe; the syringe was rinsed with DMAc, and the rinse was added to the kettle. The polymer solution (30 wt % solids) was stirred for 15 minutes; there was no indication of gel. An additive slurry containing METHACROL 2138F (a copolymer of diisopropylaminoethyl methacrylate and n-decyl methacrylate in a 75/25 weight ratio, a registered trademark of E.I. du Pont de Nemours and Company) and a hindered phenolic antioxidant (2,4,6-tris(2,6-dimethyl-4-t-butyl-3-hydroxybenzyl) isocyanurate (CYANOX 1790,Cytec Industries, West Patterson, N.J.) was added, and the final solution was stirred thoroughly to incorporate the additives. The METHACROL 2138F and CYANOX 1790 were present at 2.0 weight percent and 1.5 weight percent respectively, based on polymer weight. The total solids were reduced to 28 weight percent, based on solution weight, by the addition of 49 grams of DMAC. No gels were observed.

Results for other polymers prepared under substantially the same conditions are reported in Table 1. Whether the polymer was soluble (S), insoluble (I), or borderline (S/I) in DMAc was determined by visual observation of the solution after the addition of the chain extender composition. Polymers of this invention were soluble in DMAc and showed no sign of gel for hours or days.

TABLE 1

| Diisocyanate | Diamine | Solubility (DMAc) |
|---|---|---|
| TMMDI | EDA | I |
| TMMDI | NPDA | S |
| TMMDI | 1,2-PDA | I |
| TMMDI | 1,3-PDA | I |
| TMMDI | 1,2-DACH | I |
| TMMDI | 1,4-DAB | I |
| TMMDI | MPMD | I |
| TEMDI | EDA | I |
| TEMDI | NPDA | S |
| TEMDI | 1,2-PDA | I |
| TEMDI | 1,3-PDA | I |
| TEMDI | 1,3-BAMCH | I |
| TEMDI | MPMD | I |
| TEMDI | 1,3-DACH | I |
| DIMDI | EDA | S/I |
| DIMDI | NPDA | S |
| DIDMMDI | EDA | I |
| DIDMMDI | NPDA | S |
| TIMDI | NPDA | S |

TABLE 1-continued

| Diisocyanate | Diamine | Solubility (DMAc) |
|---|---|---|
| DMDEMDI | NPDA | S |
| DCTEMEDI | EDA | I |

As shown in Table 1, only polymers prepared from NPDA were soluble in DMAc. Similar results were observed when the polymeric glycol was 3500 molecular weight PO(4G/2Me4G) (prepared by ring-opening polymerization of tetrahydrofuran and 3-methyltetrahydrofuran).

EXAMPLE 6

An example, typical of the preparation of spandex according to the present invention is as follows: A one-liter glass resin kettle was provided with a nitrogen sweep and equipped with a metal basket stirrer and a mechanical air-driven motor. The kettle was flame dried and allowed to cool under nitrogen. 152.3 Grams of 1800 molecular weight PO4G (TERATHANE 1800, a registered trademark of E.I. du Pont de Nemours and Company) and 20 mL of toluene were added and heated at 115° C. in an oil bath with stirring for 90 minutes to dry the glycol via the toluene/water azeotrope.

The glycol was cooled to about 50° C., and 47.3 g of DMDEMDI (mw 334.42, capping ratio 1.67) was added as a white powder. The mixture was stirred for 30 minutes at room temperature and for 7 hours at 90° C., after which the resulting capped glycol was allowed to cool to room temperature and transferred to a drybox. DMAc (377 g) was added, and the mixture stirred for 90 minutes to dissolve the capped glycol. A mixture of 5.6 grams NPDA and 0.6 grams DEA dissolved in a few milliliters of DMAc was added by syringe; the syringe was rinsed with DMAc, and the rinse was added to the kettle. The polymer solution (35% solids) was stirred for 30 minutes. An additive slurry containing METHACROL 2138F and CYANOX 1790 was added, and the final solution stirred an additional 30 minutes. The METHACROL 2138F and CYANOX 1790 were present at 2.0 weight percent and 1.5 weight percent, respectively, based on polymer weight. Fibers were conventionally dry-spun at about 140 meters per minute to give a 61 dtex spandex of 5 coalesced filaments. Test results on this fiber and on corresponding fibers based on PO4G, DIDMMDI and NPDA, and on PO4G, MDI, and EDA are reported in Table 2.

TABLE 2

| [Spin No.] | [E85680-93] | [E85680-93] | [E85680-93] |
|---|---|---|---|
| [Polymer No.] | [E85680-25] | [E85680-22] | [E85680-20] |
| [Sample] | [A] | [B] | [C] |
| Diisocyanate | DIDMMDI | DMDEMDI | MDI |
| Chain Extender | NPDA | NPDA | EDA |
| LP dN/tex | 0.036 | 0.102 | 0.129 |
| UP dN/tex | 0.018 | 0.020 | 0.028 |
| Eb % | 511 | 448 | 442 |
| % Set | 19 | 18 | 42 |
| Delta b's: | | | |
| NO2 | 2.6 | 1.7 | 1.7 |
| UV | 2.7 | 2.4 | 7.4 |
| Fume | 3.8 | 3.6 | 4.6 |
| Total Delta b: | 9 | 8 | 14 |

The low percent set and excellent whiteness retention of the polymers and fibers of the present invention are apparent.

EXAMPLE 7

In another typical preparation of polyurethaneurea polymer and spandex, 100 g of 1800 molecular weight PO4G was dried for an hour at 90° C. in a resin pot. After cooling the PO4G to room temperature, 34 grams of TEMDI (mw 362.6) was added, the temperature increased to 95° C., and held for 7 hours. The %NCO was calculated to be 2.4, corresponding to a capping ratio of 1.69. The capped glycol was cooled to room temperature and 235 grams of DMAc was added, and the mixture stirred to dissolve the capped glycol. With vigorous stirring, 72 grams of a DMAc solution of 1.0N NPDA and 2.5 grams of a 1.2N diethylamine was added to chain-extend the capped glycol to the polyetherurethaneurea. The solution was about 31 weight percent polymer. The same additives at the same weight percent were mixed with the polymer'solution as for Example 6. Five filaments were conventionally dry-spun at about 140 meters per minute to give a coalesced spandex of about 67 tex. Test results are reported in Table 3.

TABLE 3

| [Spin No.] | [ETS-2121] | [ETS-2121] |
|---|---|---|
| [Part No.] | [291-A] | [285-A] |
| [Sample] | [A] | [B] |
| Diisocyanate | TEMDI | MDI |
| Chain Extender | NPDA | EDA |
| LP dN/tex | 0.047 | 0.071 |
| UP dN/tex | 0.018 | 0.019 |
| Eb % | 552 | 660 |
| % Set | 26 | 33 |
| Delta b's: | | |
| NO2 | 5.2 | 7.2 |
| UV | 3.2 | 8.5 |
| Fume | 1.4 | 5.0 |
| Thermal | 5.7 | 4.4 |
| Total Delta b: | 16 | 25 |
| % HSE (175° C.) | 71 | 52 |
| % HSE (190° C.) | 97 | 74 |

The excellent whiteness retention and heat-set efficiency of the fiber of the present invention is apparent.

EXAMPLE 8

Polyurethaneurea polymer was prepared, substantially as described in Example 7, from 3500 molecular weight PO(4G/2Me4G), TMMDI and NPDA. The spandex was dry-spun from the polymer solution as above, except at a spinning speed of 275 meters per minute. The control spandex was made from the same copolyether with MDI and ethylenediamine. Test results are shown in Table 4.

TABLE 4

| [Sample] | [A] | [B] |
|---|---|---|
| Diisocyanate | MDI | TMMDI |
| % NCO | 1.8 | 1.8 |
| Capping ratio | 1.85 | 1.85 |
| Chain Extender | EDA | NPDA |
| % HSE (175° C.) | 48 | 68 |
| % HSE (190° C.) | 70 | 83 |
| LP dN/tex | 0.041 | 0.042 |
| UP dN/tex | 0.022 | 0.022 |
| % Set | 19 | 21 |
| Eb % | 700 | 622 |

TABLE 4-continued

| [Sample] | [A] | [B] |
|---|---|---|
| Delta b's: | | |
| Fume | 5.8 | 4.6 |
| UV | 7.8 | 3.4 |

The data show the improved heat settability and resistance to environmental degradation provided by the use of TMMDI. The present invention has been illustrated by detailed descriptions and examples of preferred embodiments. Various changes in form and detail will be apparent to persons skilled in the art. The invention, therefore, must be measured by the claims and not be the descriptions of the examples of preferred embodiments.

What is claimed is:

1. A polyurethaneurea comprising the reaction product of:
    i. a polymeric glycol;
    ii. a diisocyanate composition comprising at least one Orthoalky-MDI selected from the group represented by Formula I:

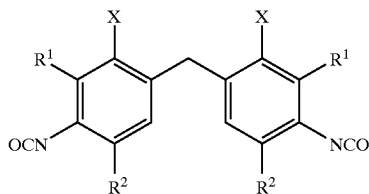

wherein:
        each $R^1$ may be the same or different and are independently selected from the group consisting of hydrogen, methyl, ethyl, propyl and isopropyl;
        each $R^2$ may be the same or different and are independently selected from the group consisting of hydrogen, methyl, ethyl, propyl and isopropyl;
        each X may be the same or different and are selected from the group consisting of hydrogen, fluorine, and chlorine;
        wherein the total amount of said at least one Orthoalkyl-MDI of Formula I is at least about 20 mole percent of said diisocyanate composition; and
    iii. a chain extender composition comprising at least one bulky diamine selected from the group consisting of: 2,2-dimethyl1.3-pentanediamine, 2,5-dimethyl-2,5-hexanediamine, 2,3,5,6-tetramethyl-1,4-diaminocyclohexane, and 2,5-dimethylpiperazine; and
    wherein the total amount of said at least one bulky diamine is at least about 80 mole percent of said chain extender composition;
    wherein said polyurethaneurea polymer is amide soluble.

2. The polyurethaneurea according to claim 1 wherein said Orthoalkyl-MDI is selected from the group consisting of bis(3,5-dimethyl-4-isocyanatophenyl)methane, bis(3,5-diethyl-4-isocyanatophenyl)methane, and mixtures thereof.

3. The polyurethaneurea according to claim 1 wherein said Orthoalkyl-MDI is bis(3,5-diethyl-4-isocyanatophenyl) methane.

4. The polyurethaneurea according to claim 1 wherein said polymeric glycol is a polyether glycol and said at least one Orthoalkyl-MDI of Formula I is at least about 60 mole percent of said diisocyanate composition.

5. The polyurethaneurea according to claim 1 wherein said bulky diamine is 2,2'dimethyl-1,3-diaminopentane.

6. The polyurethaneurea according to claim 1 wherein said at least one bulky diamine is at least about 90 mole percent of said chain extender composition.

7. The polyurethaneurea according to claim 1 wherein: (i) said polymeric glycol is selected from the group consisting of poly(tetramethyleneether) glycol and poly(tetramethyleneether-co-2-methyltetramethyleneether) glycol, (ii) said Orthoalkyl-MDI is selected from the group consisting of bis(3,5-dimethyl-4-isocyanatophenyl) methane, bis(3,5-diethyl-4-isocyanatophenyl)methane, and mixtures thereof, (iii) said at least one Orthoalky-MDI of Formula I is at least about 60 mole percent of said diisocyanate composition, and (iv) said chain extender composition comprises at least about 90 mole percent 2,2'-dimethyl-1,3-diaminopentane.

8. The polyurethaneurea according to claim 1 wherein: (i) said polymeric glycol is poly(tetramethyleneether) glycol, (ii) said Orthoalkyl-MDI is selected from the group consisting of bis(3,5-diethyl-4-isocyanatophenyl)methane, bis(3.5-diisopropyl-4-isocyanatophenyl)methane, and mixtures thereof, and (iii) said chain extender composition comprises 2,2'-dimethyl-1,3-diaminopentane.

9. Spandex comprising the polyurethaneurea polymer of claim 1.

10. Spandex comprising the polyurethaneurea of claim 7.

* * * * *